(No Model.)
J. GRIFFITH.
WELDING STEEL POINTS TO CAST IRON PLOWS.
No. 249,518. Patented Nov. 15, 1881.
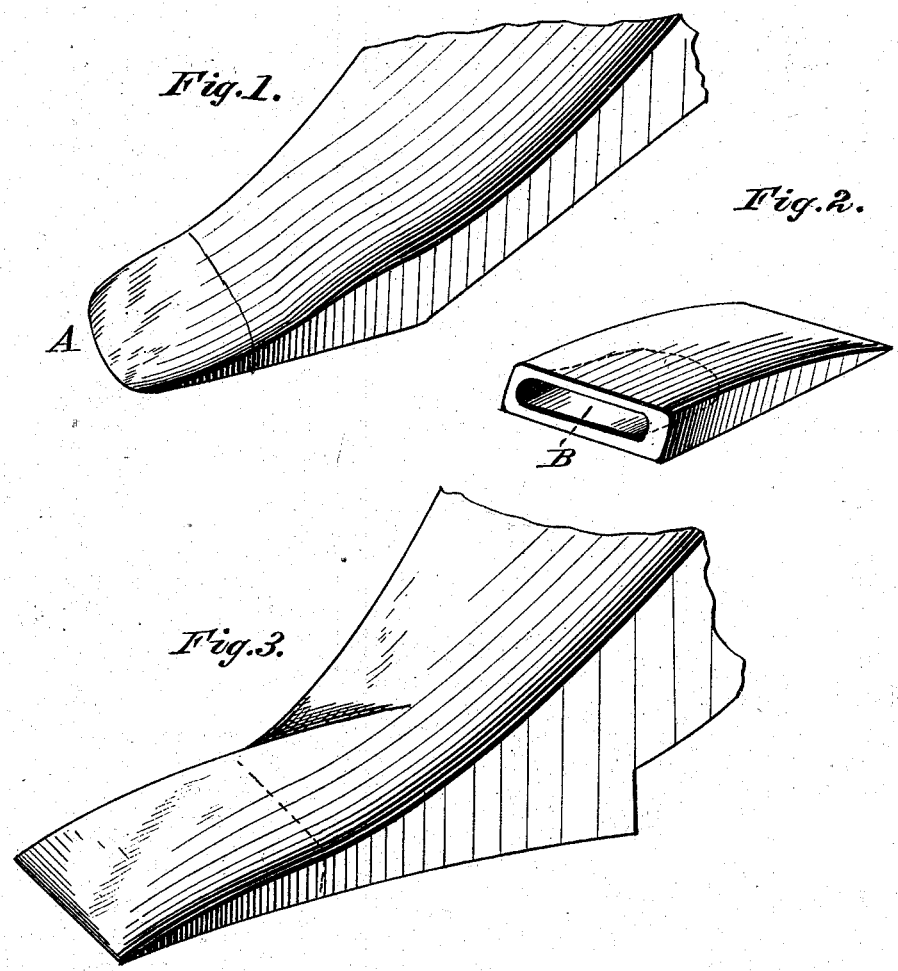

UNITED STATES PATENT OFFICE.

JOHN GRIFFITH, OF WESTON, MICHIGAN.

WELDING STEEL POINTS TO CAST-IRON PLOWS.

SPECIFICATION forming part of Letters Patent No. 249,518, dated November 15, 1881.

Application filed March 25, 1881. (No model.)

*To all whom it may concern:*

Be it known that I, JOHN GRIFFITH, of Weston, in the county of Lenawee and State of Michigan, have invented certain new and useful Improvements in Processes of and Compounds for Welding Wrought Points upon Cast-Iron Plows; and I do hereby declare that the following is a full, clear, and exact description of the invention, which will enable others skilled in the art to which it appertains to make and use the same, reference being had to the accompanying drawings, which form a part of this specification.

This invention relates to welding wrought-iron points upon cast-iron plows; and it consists in the hereinafter-described process, employing a compound of fine sand, iron scales, common salt, and borax as a part of said process.

In the annexed drawings, Figure 1 represents a plow-iron previous to the application of the wrought point. Fig. 2 represents the point ready for welding, and Fig. 3 is the plow-iron complete after welding.

Corresponding parts in the several figures are denoted by like letters of reference.

Before proceeding to describe the process of welding, I will describe my improved welding compound, which consists of the following ingredients in the annexed proportions, to wit: twelve parts, by weight, iron scales; twelve parts, by weight, fine sand; two parts, by weight, common salt; one part, by weight, borax, all mixed well and finely pulverized.

The cast plow-iron is prepared for welding by having the point cut off square, as shown at A in Fig. 1.

The butt-end of the wrought point is made with a socket, (indicated at B in Fig. 2 of the drawings.)

In carrying out the process the parts are placed in the fire, the wrought point being placed in its proper position in relation to the casting. The parts are well sprinkled with the compound. When heated to the welding-point they are removed and placed upon the anvil, where they are pressed together and suffered to remain while cooling.

The advantages of my invention are obvious. It is simple, inexpensive, and may easily be carried into practice by any blacksmith.

Having thus described my invention, I claim and desire to secure by Letters Patent of the United States—

The described process of welding wrought-iron points upon cast-iron plows, which consists in placing them in a fire properly disposed with relation to each other, then sprinkling them with the compound of fine sand, iron scales, common salt, and borax, and when the welding-heat is reached removing and pressing them together, substantially as set forth.

In testimony that I claim the foregoing as my own I have hereto affixed my signature in presence of two witnesses.

JOHN GRIFFITH.

Witnesses:
C. F. SOUTHWORTH,
S. W. SHERMAN.